March 17, 1942.  W. VAN B. ROBERTS  2,276,672
FREQUENCY MODULATION INDICATOR
Filed Oct. 26, 1940
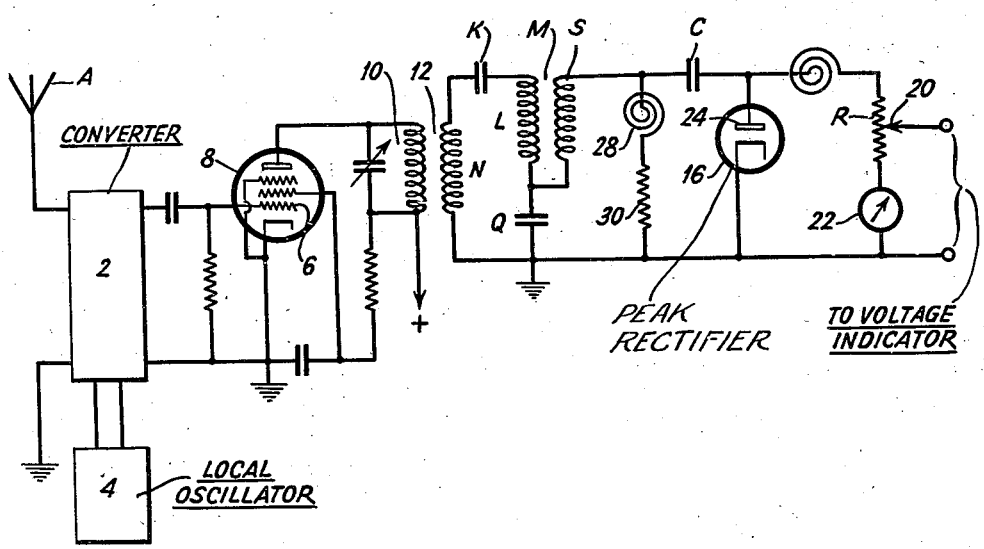
INVENTOR
WALTER VAN B. ROBERTS.
BY
ATTORNEY Patented Mar. 17, 1942

2,276,672

UNITED STATES PATENT OFFICE 2,276,672

FREQUENCY MODULATION INDICATOR

Walter van B. Roberts, Princeton, N. J., assignor to Radio Corporation of America, a corporation of Delaware Application October 26, 1940, Serial No. 362,908

5 Claims. (Cl. 179—171.5)

This application concerns a new and improved means for investigating the characteristics of wave energy of varying frequency. The means of this application is particularly adapted to use for monitoring the output of a frequency modulated transmitter.

In describing my invention, reference will be made to the drawing wherein the single figure illustrates diagrammatically the essential features of a wave monitoring means arranged in accordance with my invention.

In the drawing, A represents wave pick-up means and for purposes of illustration is shown as an aerial. The wave energy picked up by A is supplied to a wave amplifying, heterodyning, detecting, and intermediate-frequency amplifying means included in unit 2 and unit 4, the latter being designated as a source of local oscillations. Wave energy of the intermediate frequency is supplied to the control grid 6 of an electron discharge device 8, and supplied from tube 8 to a tuned circuit 10, the inductance of which forms the primary winding of a transformer 12, the secondary winding of which is the inductance N. This secondary winding N is in a circuit comprising condenser K, inductance L, condenser Q and a second inductance S between which and L a mutual inductance M is developed. The output of this circuit is coupled by coupling condenser C to a diode rectifier 16 across which is connected a very high resistance 20 and a galvanometer 22. The high resistance 20 causes the rectifier 16 to act as a peak voltage rectifier.

In operation, wave energy, the frequency of which varies, is picked up at A, amplified and reduced in frequency in 2 and 4, and supplied to the grid 6 of tube 8.

The tube 8 may be adjusted to operate either as an amplifier or a limiter. In the plate circuit of this tube is a circuit 10 tuned to the mean frequency of the wave now of intermediate frequency. Coupled to circuit 10 is another circuit NKLQ, also tuned to the mean frequency. The couplings and power factors of these two circuits are preferably so chosen that the current in the secondary circuit NKLQ is substantially constant over the full range of transmitter frequency, i. e., the intermediate frequency, corresponding to maximum allowable modulation. That is to say, these couplings are arranged to pass substantially uniformally a band of frequencies including the band through which the wave supplied by tube 8 deviates.

Another coil S is coupled to L, with mutual inductance M adjusted so that its mutual reactance is equal to the reactance of Q at the mean frequency. Inductance S is as shown in series with condenser Q. The voltage across Q is added to the voltage produced by the mutual inductance M and the polarity of the mutual is such that the sum of these two voltages is zero at the means frequency. By using the voltage produced by M on the rectifier 16, I avoid applying thereto any drop produced by current flowing in L. If the resistance of L could be made low enough, winding S could be omitted and the top end of L coupled to the left hand end of C. If this revision was made, L and Q would, of course, then be tuned to the mean frequency of the intermediate frequency energy supplied by tube 8.

When the frequency of the output of tube 8 departs from the mean in either direction, the amplitude of the voltage impressed on the diode 16 increases from zero in proportion to the frequency departure. If the capacity C and the resistance R form a time constant which is long compared to the period of the lowest modulation frequency, but short compared to variations in program level, the potential of the diode anode 24 will be proportional to the maximum frequency deviation, regardless of whether this deviation happens to be on one side of the mean frequency, or the other. Thus, a galvanometer 22 in series with R will indicate, by exceeding a certain reading, that over-modulation is taking place. In place of a galvanometer 22 there can, of course, be used the ordinary so-called "Magic Eye" tube, connected to indicate voltage across R.

In order that the time constant of the diode system should be dependent only upon capacity C a choke coil 28 and resistance 30 may be shunted between the ground and the left side of C to maintain the direct-current potential definitely at zero at this point. Furthermore, in some cases, it may be advantageous to omit the aforesaid choke coil 28 and adjust the resistance 30 to such a value that its loading effect on the tuned circuit will assist in maintaining the current through L and Q more nearly constant.

The value of the present arrangement is that it reads directly in proportion to the modulation if the modulation is symmetrical, while if the modulation is unsymmetrical its reading is proportional to the maximum instantaneous deviation, regardless of the direction thereof, and this latter deviation is what must be kept within predetermined limits in order to avoid overshooting the characteristics of the discriminator at the receiver.

What is claimed is:

1. A modulation indicator for frequency modulated transmission including, means for developing a voltage the amplitude of which is substantially zero at the carrier frequency and which increases substantially in proportion to the difference between the instantaneous frequency of the transmission, and the carrier frequency thereof, a peak rectifier in a circuit including impedance and capacity coupled to said means for rectifying said voltage, an indicator coupled to said rectifier for indicating the rectified voltage, the time constant of the circuit of the rectifier being greater than the longest period of the modulation, but short compared with variations in modulation level.

2. In means for analyzing the characteristics of wave energy of varying frequency, a tuned circuit including an inductance and a capacitance in a closed circuit tuned to the mean frequency of said wave energy, means for impressing said wave energy on said tuned circuit, a second circuit including, in series, an inductance and at least a portion of the capacitance in said first circuit, said last named inductance being coupled to an inductance in said first circuit, peak rectifying means coupled with said second circuit, and current indicating means coupled with said rectifying means.

3. In means for analyzing the characteristics of wave energy of varying frequency, a circuit tuned to the mean frequency of the said wave energy, means for impressing wave energy of varying frequency on said circuit, a second tuned circuit comprising an inductance and a capacitance in a circuit tuned to the mean frequency of said wave energy, a third circuit comprising an inductance and capacitance of said second circuit, said last named inductance being coupled to an inductance in said second circuit to provide a mutual inductance substantially equal to said capacitance of the second circuit at the mean frequency of said impressed wave energy, rectifying means coupled with said third circuit, and current indicating means coupled with said rectifying means.

4. In means for analyzing the characteristics of wave energy of varying frequency, a tuned circuit comprising an inductance and a capacitance in a closed circuit tuned to the mean frequency of said wave energy, means for impressing said wave energy on said tuned circuit, a second circuit including, in series, an inductance and at least a portion of the capacitance in said first circuit, said last named inductance being coupled to an inductance in said first circuit by a coupling such that the total mutual impedance between said first and second circuits is substantially zero at the mean frequency, peak rectifying means coupled with said second circuit, and current indicating means coupled with said rectifying means.

5. In means for analyzing the characteristics of wave energy of varying frequency, a peak voltage rectifier coupled to direct current indicating means, a closed circuit including an inductance and a capacity in series, means for impressing wave energy of varying frequency to be analyzed on said capacity and inductance, said series circuit being series tuned to the mean frequency of the impressed wave energy whereby voltage of low amplitude is developed across said series inductance and capacity when said impressed wave energy is of said means frequency and the voltage developed across said series inductance and capacity increases substantially proportional to deviations of the frequency of the impressed wave energy in either direction from said mean frequency, and means coupling said rectifier to said inductance and capacity to transfer voltage developed across said inductance and capacity to said rectifier.

WALTER van B. ROBERTS.